United States Patent [19]

Wang

[11] Patent Number: 5,086,239
[45] Date of Patent: Feb. 4, 1992

[54] NONLINEAR OPTICAL ELEMENTS CONTAINING J-AGGREGATES OF AROMATIC DYES

[75] Inventor: Ying Wang, Wilmington, Del.

[73] Assignee: E. I. Du Pont de Nemours and Company, Wilmington, Del.

[21] Appl. No.: 482,968

[22] Filed: Feb. 22, 1990

[51] Int. Cl.[5] .................... H03F 7/00; C09K 11/06
[52] U.S. Cl. .................... 359/328; 252/301.17; 252/582; 252/585; 252/586; 252/587
[58] Field of Search .................... 252/301.17, 582, 585, 252/586, 587; 307/427

[56] References Cited

U.S. PATENT DOCUMENTS

| | | | |
|---|---|---|---|
| 3,314,894 | 4/1967 | Nyilas | 252/301.17 |
| 3,417,083 | 12/1968 | Reynolds | 549/384 |
| 3,753,146 | 8/1973 | Reynolds | 372/53 |
| 3,779,937 | 12/1973 | Kitzing | 252/582 |
| 3,843,939 | 10/1974 | Groff | 330/4.3 |
| 4,692,636 | 4/1987 | Wang | 307/427 |
| 4,723,248 | 2/1988 | Harter | 372/25 |
| 4,796,981 | 1/1989 | Nishimura | 350/353 |
| 4,948,225 | 8/1990 | Rider | 350/96.34 |

OTHER PUBLICATIONS

Eastman Laser Products, Eastman Kodak Co., 1979, pp. 11–15.

Primary Examiner—Prince Willis, Jr.
Assistant Examiner—Thomas Steinberg

[57] ABSTRACT

A nonlinear optical device capable of resonant third order nonlinear optical effects is disclosed comprising a source of coherent optical radiation and a nonlinear optical element which comprises an aromatic dye capable of forming J-aggregates present in an aggregated ordered form.

14 Claims, 4 Drawing Sheets

NONLINEAR OPTICAL ELEMENTS CONTAINING J-AGGREGATES OF AROMATIC DYES

FIELD OF THE INVENTION

This invention relates to nonlinear optical systems, and particularly to compositions capable of generating third order nonlinear optical effects.

BACKGROUND OF THE INVENTION

Interest in the field of opto-electronics has triggered an intense search for organic compounds (monomeric, polymeric or heterogeneous) which incorporate the desired optical properties (e.g., large optical nonlinearity, fast optical response, transparency to laser radiation, and phase matchability) into a robust material which can be easily fabricated. Although a variety of organic systems (e.g., crystalline compounds, inclusion complexes, and polymers) have been shown to be capable of second harmonic generation, many fewer systems have been developed for generating third order nonlinear optical effects.

It has now been found that J-aggregates are capable of producing resonant third order nonlinear optical effects, with $\chi^{(3)}$ values which rival those of any known organic system. Moreover, the J-aggregates can be formed in solution, or incorporated into glasses or polymers to give materials which can be fabricated into a variety of shapes.

Aggregation of certain organic dyes to form the so-called "J-aggregates" is a well-known, but little-understood, phenomenon that was first observed in the 1930's.

The absorption spectra of most dyes follow Beer's Law over a wide concentration range, so that the measured absorption of light is proportional to the concentration of the dye in solution. It has been observed for some dyes, however, that certain changes in the environment of the dye (e.g., temperature, concentration, dielectric constant) cause the appearance of a new absorption maximum at a wavelength longer than that of the monomer (i.e., the unperturbed transition obtained in highly dilute aqueous or alcoholic solutions, sometimes referred to as the M-band). The new transition, which is sometimes called a J-band, can be narrow, intense, and can exhibit resonance fluorescence. The appearance of J-bands has been rationalized in terms of dye aggregation. It is generally known that a J-aggregate consists of 100-500 dye monomers, but it's absorption spectrum stays unchanged once the size is longer than about 5 monomers. A comprehensive review of this subject can be found in A. H. Herz, Adv. in Colloid and Interface Science, 8, 237 (1977).

Dyes which form these so-called J-aggregates are generally large organic molecules (M.W. above 300) which have a small proportion of water-miscible to water-immiscible groups. Other molecular characteristics which favor the formation of J-aggregates include compactness and no large deviation from planarity. Classes of dyes which form J-aggregates include pyrilium, cyanine, carbocyanine, phthalocyanine and squaraine dyes. Some of these dyes are used as photo-sensitizers in photographic films.

J-aggregates of pyrilium dyes in certain polymeric matrices are known to be capable of second harmonic generation (U.S. Pat. No. 4,692,636). Third order nonlinear optical effects were not disclosed.

Nonresonant third order nonlinear polarizability of a number of linear conjugated molecules, including monomers, but not J-aggregates, of some cyanine dyes, has been disclosed by Stevenson et al. (Mat. Res. Soc Symp. Proc., Vol. 109, "Nonlinear Optical Properties of Polymers", edited by A. J. Heeger, et al., pp 103-108). Resonant third order nonlinear effects were not disclosed, nor would they be anticipated on the basis of the nonresonant properties.

Moosad et al., Pramana 1988, Vol. 31, No. 4, pp 281-287, have disclosed the properties of a few saturable absorbers as candidates for low power optical phase conjugation (OPC). The specific systems studied were the dyes eosin, erythrosin B, and Rose Bengal, doped in gelatin, poly(vinyl alcohol) and boric acid glass films. However, these systems do not exist in J-aggregate form and, consequently, do not exhibit enhanced third order optical nonlinearity.

SUMMARY OF THE INVENTION

The present invention provides a nonlinear optical device capable of resonant third order nonlinear optical effects comprising a nonlinear optical element and a source of coherent optical radiation, said nonlinear optical element comprising an aromatic dye capable of forming J-aggregates present in an aggregated ordered form.

The present invention also provides a method for generating third order nonlinear optical effects, comprising illuminating said nonlinear optical device with coherent optical radiation.

DETAILED DESCRIPTION OF THE INVENTION

Figure 1:
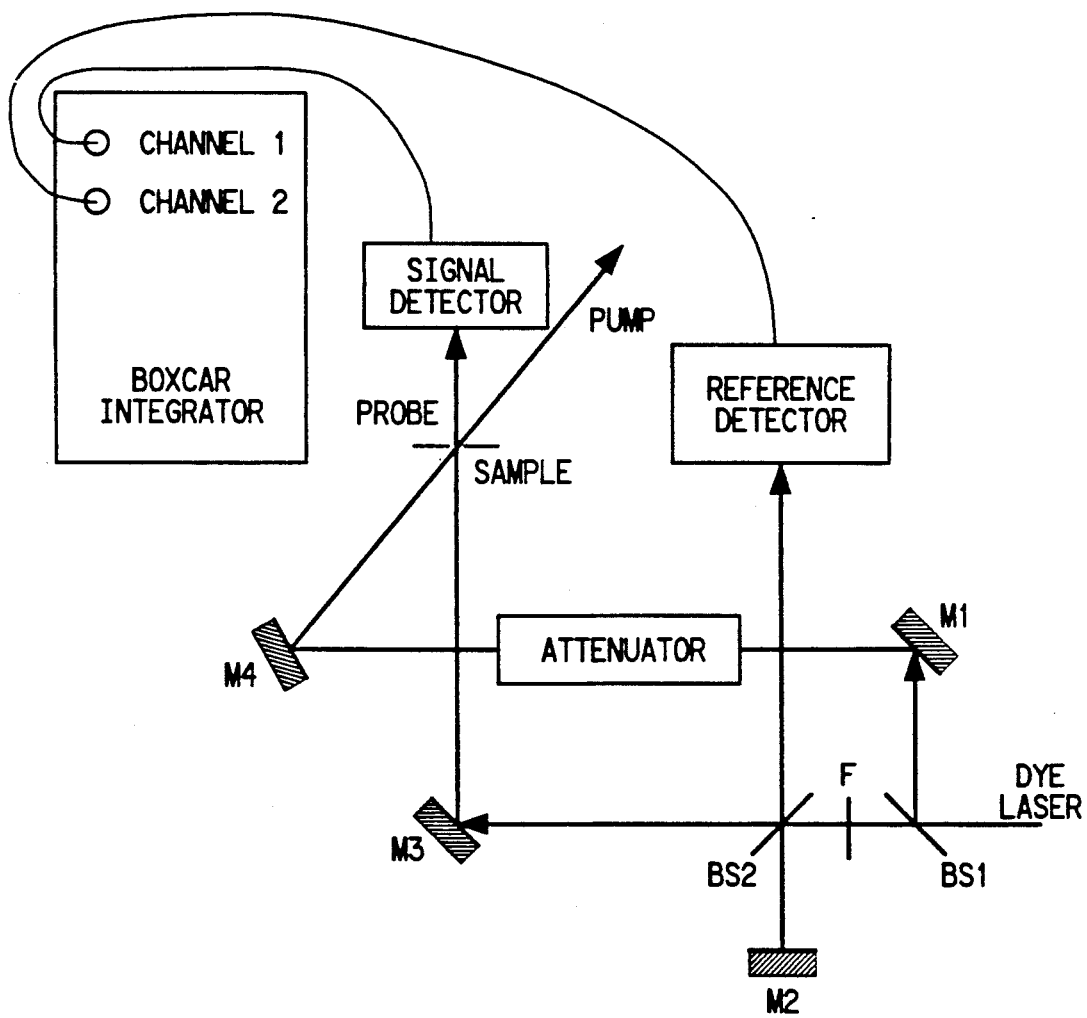
FIG. 1 depicts the optical arrangement used to measure laser-induced absorption change via the pump-probe technique.

The present invention provides a nonlinear optical device capable of resonant third order nonlinear optical effects comprising a nonlinear optical element and a source of coherent optical radiation.

The present invention also provides a nonlinear optical element comprising an aromatic dye capable of forming J-aggregates present in an aggregated ordered form.

The present invention also provides a method for generating third order nonlinear optical effects, comprising illuminating said nonlinear optical device with coherent optical radiation.

The present inventions are useful in the field of opto-electronics. For example such inventions are useful to improve resolution in optical recording, for phase conjugation used in imaging correction applications, or for optic switching as used in communications and computers.

Suitable aromatic dyes capable of forming J-aggregates include the classes of dyes known as pyrilium, cyanine, carbocyanine, phthalocyanine and squaraine dyes. Preferred pyrilium dyes are pyrilium dye salts having the following formula (I):

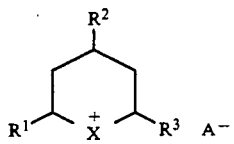

wherein $R^1$ and $R^3$, individually, comprise phenyl radicals or substituted phenyl radicals having at least one substituent comprising an alkyl radical having 1 to 6 carbon atoms; $R^2$ comprises 4-dimethylaminophenyl; X comprises NH, O, S, Se or Te; and A is an anion comprising perchlorate, fluoroborate, tetrafluoroborate, hexafluorophosphate, iodide, chloride, bromide, sulfate, periodate, or p-toluenesulfonate.

Specific examples of suitable dyes include, but are not limited to salts of: 1,1'-di-(4-sulfobutyl)-2,2'-cyanine; 5,5'-dichloro-3,3'-di-(4-sulfobutyl)-9-ethylthiacarbocyanine; 5,5'-dichloro-3,3'-di-(2-carboxyethyl)-9-ethylthiacarbocyanine; 5,6,5',6'-tetrachloro-3,3'-di-(4-sulfobutyl)-8,8'-diethylazacarbocyanine; 1,1'-diethyl-6,6'-dimethyl-2,2'-cyanine; 3,3'-dimethyl-9-ethylthiacarbocyanine; 3,3'-diethyl-9-methyl-4,5,4',5'-dibenzthiacarbocyanine; 3,3'-dimethyl-9-ethyl-4,5,4',5'-dibenzthiacarbocyanine; 5,5'-dichloro-3,3',9-triethylthiacarbocyanine; 3,3'-dimethyl-5,5'-dichloro-9-ethylthiacarbocyanine; 1',3-diethylthia-2'-cyanine; 1,1'-diethylselena-2'-cyanine; 1-methyl-1'-octadecyl-2,2'-cyanine; 1,1',3,3'-tetraethyl-5,5',6,6'-tetrachlorobenzimidazolocarbocyanine; 1,1'-diethyl-2,2'-pyridoeyanine; 4-[(1,3,3'-trimethyl-2-indolenylidene)ethylidene]-3-methyl-1-phenyl-5-pyrazalone; bis[4(dimethylamino)phenyl]squaraine; bis[4-(methoxyphenyl)squaraine, t-butyl vanadyl phthalocyanine, 1,1'-diethyl-2,2'-cyanine halide (also known as pseudoisocyanine halide) having the following structure of formula (II) wherein X is halide and is chloride, bromide or iodide:

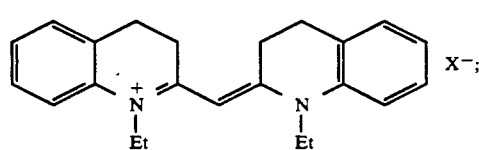

2,6-diphenyl-4-(4'-dimethylamino)phenyl-thiapyrilium tetrafluoroborate having the following structure of formula (III):

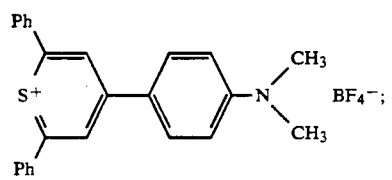

or a carbocyanine dye having he following structure of formula (IV), (V), or (VI) respectively:

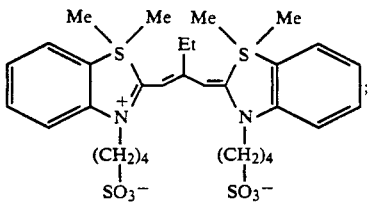

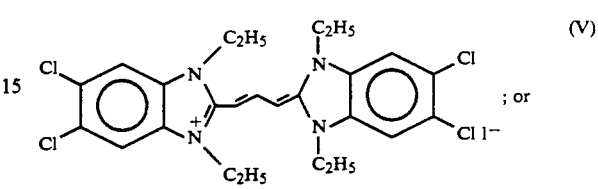

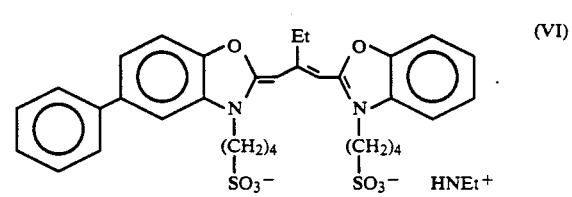

The dyes described above form J-aggregates in solution spontaneously, or upon addition of salts (e.g., NaCl), polyelectrolyte (e.g., polyvinyl sulfate), exposure to certain nonsolvents (e.g., 1,1,2,2-tetrachloroethane) or other changes in the environment of the dye, such as lowering the temperature, increasing the concentration, or deposition onto certain solid substrates, e.g. silver halide.

In this invention, the optical element comprises a J-aggregate which can be incorporated in the form of a solution, in a gel or polymer, or in a glass. The aggregates can be as large as tens of microns. For optical applications, the preferred size is less than about 0.1 micron in the longest dimension. The concentration of aggregate employed can be dependent upon its solubility, with higher dye concentration less viscous samples can be used.

A material is said to have third order nonlinearity if its index of refraction, n, depends on the intensity of light, I, $$n = n_0 + n_2 I \tag{1}$$

or $$\Delta n = n_2 I \tag{2}$$

where $n_0$ represents the index of refraction at very low light intensity and $n_2$ is the nonlinear refraction coefficient which measures the magnitude of the nonlinearity. The commonly used unit for $n_2$ in MKS units is $cm^2/KW$.

Another parameter that is often used to characterize third order nonlinearity is $\chi^{(3)}$, usually expressed in cgs units as esu. Both $n_2$ and $\chi^{(3)}$ are related through the following formula (see "Optical Bistability: Controlling Light with Light", H. M. Gibbs, Academic Press, New York, 1987):

$$n_2(cm^2/KW) = \tfrac{1}{2}\{4\pi/n_0\}^2 \chi^{(3)}(esu) \tag{3}$$

The third order nonlinearity of a material can be further categorized as resonant and non-resonant. Resonant means the laser wavelength overlaps with the absorption band of the material, i.e., the material absorbs the light, and nonresonant means otherwise. In the case of resonant nonlinearity, the absorption coefficient, $\alpha$, of the material depends on the laser intensity, $$\alpha = \alpha_0 + \alpha_2 I \quad (4)$$

or $$\Delta\alpha = \alpha_2 I \quad (5)$$

where $\alpha_0$ represents the absorption coefficient at very light intensity and $\alpha_2$ is the nonlinear absorption coefficient which also measures the magnitude of the nonlinearity. Both $\Delta\alpha$ and $\Delta n$ are related through the Kramers-Kronig relationship:

$$\Delta n(E) = \frac{ch}{2\pi^2} P \int_0^\infty \frac{\Delta\alpha(E')}{(E')^2 - E^2} dE' \quad (6)$$

where c is the speed of light, h is Planck's constant, E is the light frequency, and P is the Cauchy principal value of the integral:

$$P \int_0^\infty = \lim_{a \to 0} \left( \int_0^{E-a} + \int_{E+a}^\infty \right) \quad (7)$$

Experimentally, one can measure either $\Delta\alpha$ or $\Delta n$ and obtain all the third order nonlinearity parameters, $\alpha_2$, $n_2$, and $\chi^{(3)}$ through equations (1)–(7). While for nonresonant nonlinearity, either $n_2$ or $\chi^{(3)}$ alone is sufficient for characterizing the magnitude of the nonlinearity, an additional parameter, $\chi_0$, is needed in the case of resonant nonlinearity. This is because the nonlinearity depends on, and is limited by, the absorption coefficient of the material at the laser wavelength. Therefore in the case of resonant nonlinearity, $\alpha_2/\alpha_0$, $n_2/\alpha_0$, and $\chi^{(3)}/\alpha_0$ are the correct parameters to use for measuring the nonlinearity. One can characterize the nonlinearity by measuring $\Delta\alpha$ with the pump-probe technique described below and expressing the nonlinearity either as $\alpha_2/\alpha_0$ or $\Delta\alpha/\alpha_0$.

If a material has significant $n_2$ or $\alpha_2$, many third order nonlinear optical phenomena such as optical bistability and phase conjugation (degenerate four-wave mixing) can be demonstrated. Phase conjugation experiments (described in the following section) have been performed on some of the materials of the invention. The phase conjugation efficiency, defined as the intensity ratio of the phase conjugated beam and the probe beam, is also a measure of the nonlinearity. It has contributions from both $n_2$ and $\alpha_2$ and is proportional to:

$$[(2\pi n_2 \lambda)^2 + (\alpha_2/2)^2] I^2$$

where $\lambda$ is the laser wavelength and I is the intensity of the pump beam. The phase conjugation efficiency depends on the geometry of the optical set-up, the spatial quality of the laser beam, and the optical quality of the sample. It is therefore not a good universal parameter for comparing the intrinsic nonlinearity of the materials.

Laser-Induced Absorption Changes (pump-probe technique)

The change of sample transmission, $I_t$, as a function of the incident laser power was measured by absorption changes using the pump-probe technique. The laser-induced transmission change measures the magnitude and the speed of the optical nonlinearity. The result is expressed as $\Delta OD/OD_0$, where $OD_0$ is the low-power optical density defined as $-\log(I_t/I_0)$ and $\Delta OD$ is the induced change in optical density, $$\Delta OD/OD_0 \Delta\alpha/\alpha_0$$

Samples prepared for evaluation were irradiated by a dye laser, using an optical arrangement corresponding to that depicted in FIG. 1. As indicated in FIG. 1, a 10/90 beam splitter 1 (BS1) divided the dye laser pulse into two parts. One part, the strong pump beam, was directed sequentially to a mirror (M1), an attenuator and another mirror (M4). The other beam, a weak probe beam, was directed through a filter (F) and then to a 50/50 beam splitter (BS2). One part of the signal from BS2 was directed to a mirror (M2), which sent the signal back through BS2 and to a detector, providing the reference signal. The other part of the probe beam from BS2 was directed to a mirror (M3). The pump beam (from M4) and the probe beam (from M3) were directed to the sample, and overlapped at the sample spatially and temporally. The intensity of the probe beam transmitted through the sample, It, was measured by a signal detector and divided by the intensity of the signal from the reference detector by a boxcar integrator to correct for the laser intensity fluctuations. The power dependence of $\Delta OD$ was obtained by measuring the change in intensity of the transmitted beam as a function of the pump beam intensity, where the intensity of the pump beam is adjusted by the attenuator.

Degenerate Four-Wave Mixing (DFWM)

Figure 2:
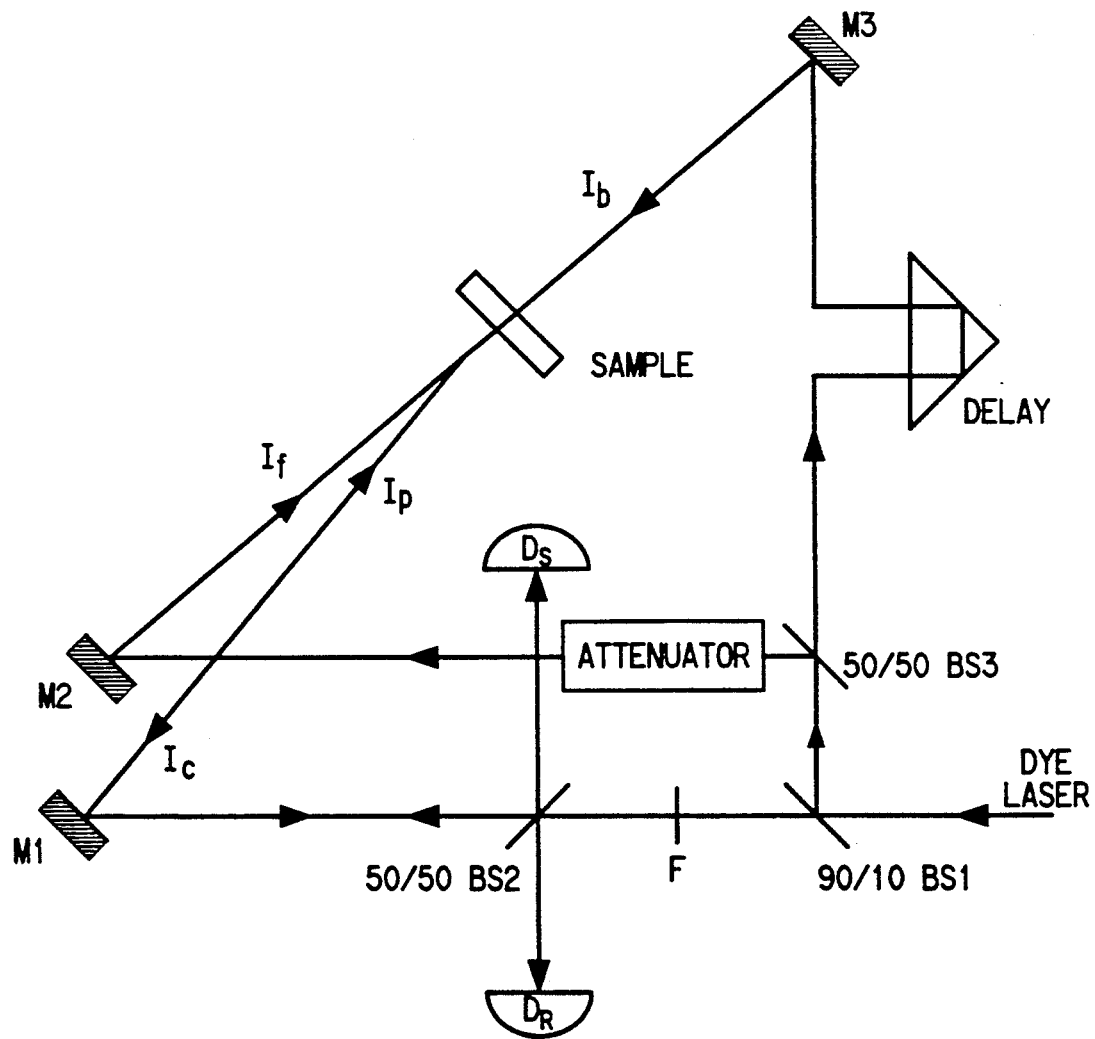
FIG. 2 depicts the optical arrangement used to measure the effect of absorption change and refractive index change via degenerate four-wave mixing.

Samples prepared for evaluation were irradiated by a dye laser, using an optical arrangement corresponding to that depicted in FIG. 2. As indicated in FIG. 2, a 10/90 beam splitter 1 (BS1) divided the dye laser pulse into two parts. One part, the weak signal from BS1, was directed to a 50/50 beam splitter (BS2), sending a reference beam to the reference detector ($D_R$) and a probe beam ($I_p$) to a mirror (M1). The other part of the signal from BS1 was directed to a 50/50 beam splitter (BS3). Part of this beam, the forward pump beam ($I_f$), was directed to an attenuator and a mirror (M2). The other part of this beam, the backward pump beam ($I_b$), was directed through a delay and then to a mirror (M3). The forward and backward pump beams (from M2 and M3) and the probe beam (from M1) are directed at the sample and overlap there spatially and temporally. The phase conjugated beam ($I_c$) retraces the path followed by $I_p$ to BS2 and is detected by the signal detector ($D_S$). The magnitude of $I_c$ measures the optical nonlinearity of the sample. $I_c$ was divided by the signal from the reference detector to correct for the laser intensity fluctuations. The power dependence of the nonlinearity was measured by adjusting the intensity of the $I_f$ with the attenuator. The time dependence of the nonlinearity was measured by adjusting the arrival time of the $I_b$ with the delay line.

For the samples evaluated in these experiments, the dominant contribution to the nonlinearity is due to laser-induced absorption bleaching and the associated change in refractive index. The pump-probe experiment measures the sample absorption change, and the associated change in refractive index can be obtained through the Kramers-Kronig analysis. The DFWM experiment measures the contribution from both the absorption change and the refractive index change. The observation of large absorption change from the pump-probe experiment can be correlated to the observation of a strong phase-conjugated signal from the DFWM experiment.

EXAMPLES

Example 1

Two aqueous solutions of pseudoisocyanine chloride (PIC) with concentrations of $1 \times 10^{-3}$M and $8 \times 10^{-3}$M were prepared. After standing overnight at room temperature, the absorption spectrum of the $1 \times 10^{-3}$M solution showed only the monomer and dimer bands, whereas the $8 \times 10^{-3}$M solution showed a strong J-aggregate band.

Pump-probe experiments on the $1 \times 10^{-3}$M solution showed that the nonlinearities of the PIC monomer and dimer are small ($\Delta\alpha/\alpha_0 < 0.02$, using a pulse energy of 0.96 mj at 480 nm). However, the nonlinearity of the corresponding J-aggregate is an order of magnitude larger ($\Delta\alpha/\alpha_0 = 0.19$, measured at 574 nm on the $8 \times 10^{-3}$ M solution with a pulse energy of 0.49 mj), thus demonstrating that J-aggregates display enhanced optical nonlinearities relative to the corresponding unaggregated (i.e., monomeric or dimeric) species.

Example 2

To enhance the formation of J-aggregates, NaCl was o added to a $4 \times 10^{-4}$M solution of 1,1'-diethyl-2,2'-cyanine chloride, known as pseudoisocyanine chloride, solution to make a concentration of $1 \times 10^{-2}$M. The nonlinearity of the J-aggregate was determined by power-dependent absorption bleaching experiments (or pump-probe) at 574 nm to be $2.6 \times 10^{-7}$ cm$^2$/W, expressed as $\alpha_2/\alpha_0$.

Example 3

Figure 3:
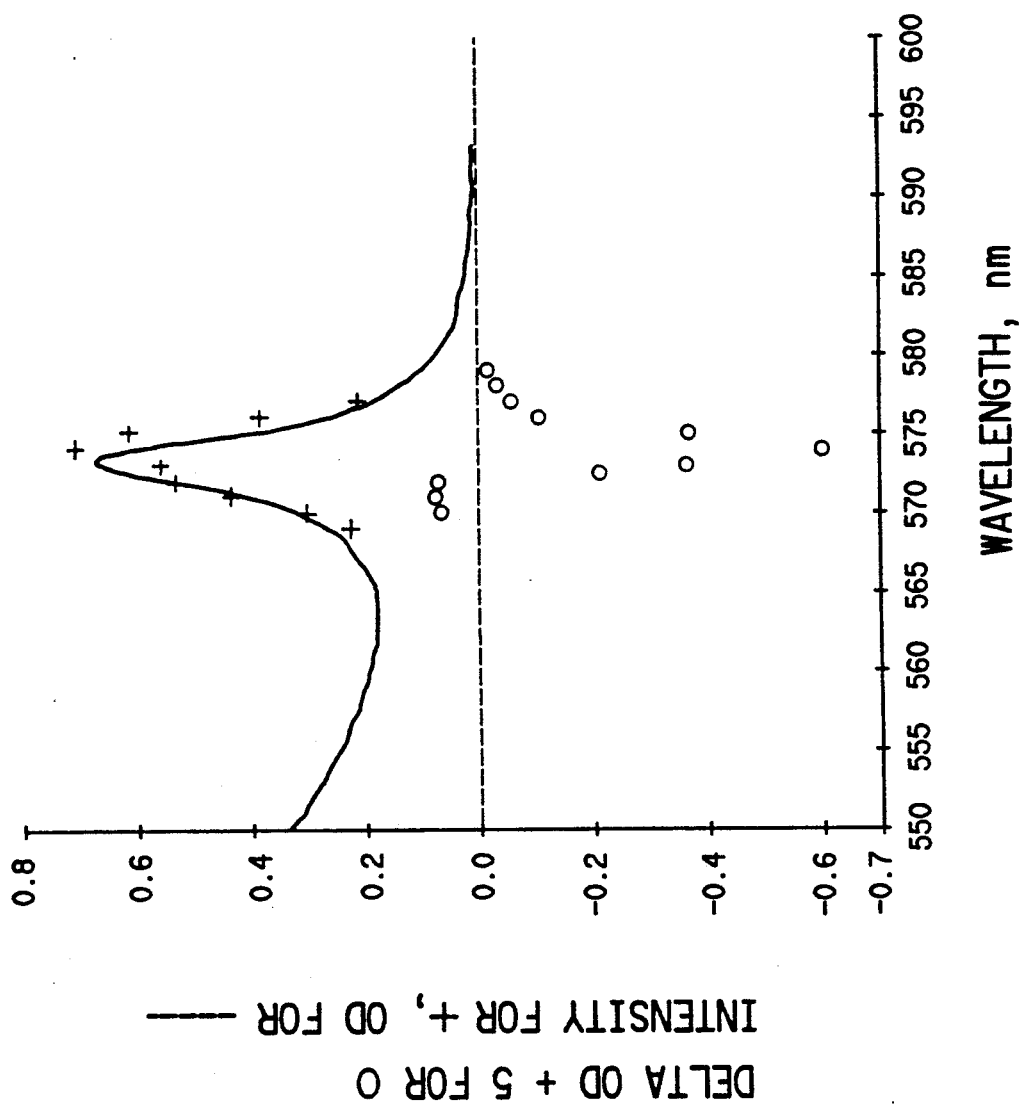
FIG. 3 shows a graph of optical density versus wavelength for the absorption spectrum of pseudoisocyanine chloride J-aggregate; the intensity versus wavelength for its degenerate four-wave mixing signal; and the change in optical density multiplied times 5 versus the wavelength for its absorption bleaching signal.
Figure 4:
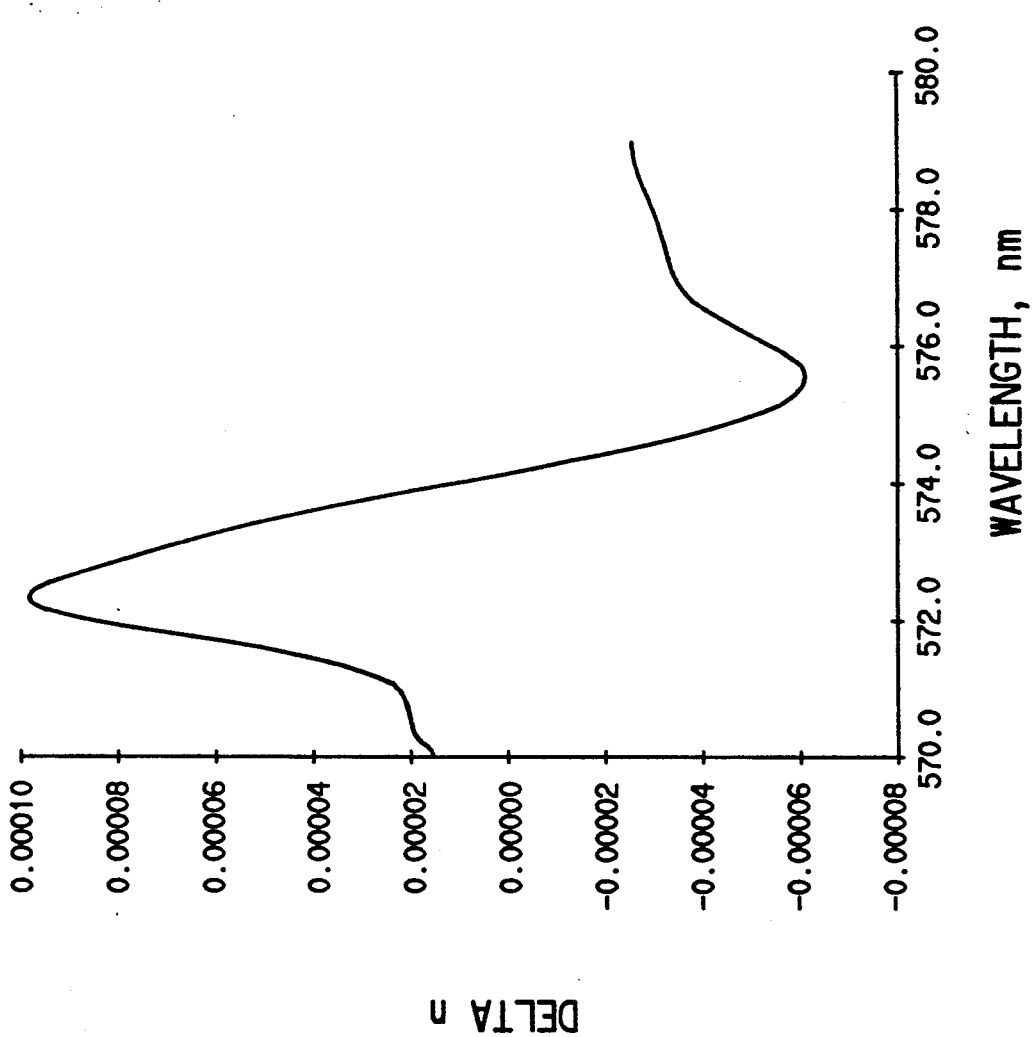
FIG. 4 shows a graph of the change in index of refraction, $\Delta n$, obtained through Kramers-Kronig analysis, versus wavelength for pseudoisocyanine chloride J-aggregate.

An aqueous solution of $4 \times 10^{-4}$M 1,1'-diethyl-2,2'-cyanine chloride, known as pseudoisocyanine chloride, and $1 \times 10^{-2}$ M NaCl was prepared as described in Example 2. Degenerate four wave mixing (DFWM) signal was observed from the solution in the wavelength region covering the J-aggregate absorption band (approximately 568 to 578 nm). FIG. 3 shows the dependence of DFWM on wavelength. Wavelength dependent pump-probe experiments were also performed on this solution. FIG. 3 shows the dependence of absorption bleaching of the J-aggregate on wavelength ($\Delta$OD vs. $\lambda$); FIG. 4 shows the dependence of the change in index of refraction on wavelength ($\Delta n$ vs. $\lambda$).

Example 4

A J-aggregate of pseudoisocyanine chloride (PIC) in a thin polymer film was prepared by mixing a methanol solution of PIC chloride (1 mL, $7 \times 10^{-3}$M) with an aqueous solution of gelatin (1 g in 10 mL of water) and then casting the resulting solution onto a glass substrate. The absorption spectrum of the thin film showed the characteristic J-aggregate absorption band near 572 nm.

EXAMPLE 5

A J-aggregate of pseudoisocyanine chloride (PIC) in a thin glass film was prepared by mixing a methanol solution of pseudoisocyanine chloride (PIC) (1 mL, $7 \times 10^{31}$ $^3$M) with 1 mL of a sol-gel solution, adding NaCl (approximately 2.5 mg) to the solution, and then casting the solution onto a glass substrate. The sol-gel solution was prepared by mixing 5 mL of tetramethylorthosilicate with 8 mL of methanol and 1.5 g of a composition of the formula

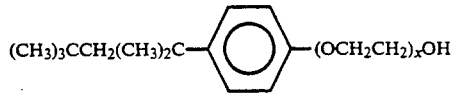

where $x = 10$ (average), stirring until the mixture was homogeneous, and then adding 6 mL of water. The absorption spectrum of the thin glass film showed the characteristic J-aggregate absorption band near 576 nm.

Example 6

Thiapyrilium (TPY) boron tetrafluoride (0.015 g) was dissolved in a mixture of 1,1,2,2-tetrachloroethane (11.1 mL) and methanol (1.3 mL) and the solution filtered. Phenyl-bis(4-diethylamino-2-methyl-phenyl)methane (0.6 g) and poly(4,4'-iso-propylidenephenyl carbonate (1 g) were then added to the solution. After total dissolution (about 1 day), the solution was cast onto a glass substrate to form a thin film of deep blue color. To induce formation of the J-aggregate, the film was exposed to 1,1,2,2-tetrachloroethane vapors. A color change to light blue and green, and an accompanying red-shift of the absorption band to about 660–690 nm, indicates the formation of the aggregate.

Enhanced optical nonlinearity of TPY aggregates was established by pump-probe experiments, in which $\Delta\alpha/\alpha_0 = 0$ (at 480 nm) for the monomers and $\Delta\alpha/\alpha_0 = 0.11$ at 660 nm with a pulse energy of 0.18 mj for the aggregates.

Example 7

The carbocyanine dye of formula (IV) as previously defined (0.03 g) was dissolved in 10 mL of water. NaCl (0.014 g) was added to 2 mL of the aqueous dye solution. The formation of J-aggregates was indicated by the appearance of a new absorption band at about 624 nm.

Optical nonlinearity of the J-aggregates was measured at 627 nm using the pump-probe technique. A value of $\Delta\alpha/\alpha_0 = 0.12$ was obtained using a 0.31 mj laser pulse.

Example 8

The carbocyanine dye of formula (VI) as previously defined (0.01 g) was dissolved in 500 mL of water. The J-aggregates appeared immediately with a characteristic absorption band at about 560 nm.

Example 9

The carbocyanine dye of formula (VI) as previously defined (0.0096 g) was dissolved in methanol (10 mL). This solution was then mixed with an equal portion of an aqueous gelatin solution (2 g gelatin in 20 mL of water). The addition of gelatin changed the solution color from yellow to fluorescent pinkish-yellow. The absorption spectrum showed a characteristic J-aggregate band at 542 nm.

Optical nonlinearity of the J-aggregates was measured at 560 nm using the pump-probe technique. A value of $\Delta\alpha/\alpha_0 = 0.19$ was obtained using a 6.6 mj laser pulse.

Example 10

The carbocyanine dye of formula (V) as previously defined (0.009 g) was dissolved in methanol (15 mL). A portion of this solution was then mixed with an equal portion of an aqueous gelatin solution (1 g gelatin in 10 mL of water), whereupon the color of the solution changed from yellow to rosey-red. The solution was cast onto a glass substrate to form a thin polymer film. The absorption spectrum showed a characteristic J-aggregate absorption band at 592 nm.

What is claimed is:

1. A nonlinear optical device capable of resonant third order nonlinear optical effects comprising a nonlinear element and a source of coherent optical radiation, said nonlinear optical element comprising a dye of the classes of cyanine, carbocyanine, phthalocyanine, or squaraine capable of forming J-aggregates present in an aggregated ordered form.

2. The device of claim 1 wherein the dye is a salt of: 1,1'-di-(4-sulfobutyl)-2,2'-cyanine; 5,5'-dichloro-3,3'-di-(4-sulfobutyl)-9-ethylthiacarbocyanine; 5,5'-dichloro-3,3'-di-(2-carboxyethyl)-9-ethylthiacarbocyanine; 5,6,5',6'-tetrachloro-3,3'-di-(4-sulfobutyl)-8,8'-diethyl-azacarbocyanine; 1,1'-diethyl-6,6'-dimethyl-2,2'-cyanine; 3,3'-dimethyl-9-ethylthiacarbocyanine; 3,3'-diethyl-9-methyl-4,5,4',5'-dibenzthiacarbocyanine; 3,3'-dimethyl-9-ethyl-4,5,4',5'-dibenzthiacarbocyanine; 5,5'-dichloro-3,3',9-triethylthiacarbocyanine; 3,3'-dimethyl-5,5'-dichloro-9-ethylthiacarbocyanine; 1',3-diethylthia-2'-cyanine; 1,1'-diethylselena-2'-cyanine; 1-methyl-1'-octadecyl-2,2'-cyanine; 1,1',3,3'-tetraethyl-5,5',6,6'-tetrachloro-benzimidazolocarbocyanine; 1,1'-diethyl-2,2'-pyridocyanine; 4-[(1,3,3'-trimethyl-2-indolenylidene)-ethylidene]-3-methyl-1-phenyl-5-pyrazalone; 1,1'-diethyl-2,2'-cyanine halide having the following structure of formula (II) wherein X is halide and is chloride, bromide or iodide:

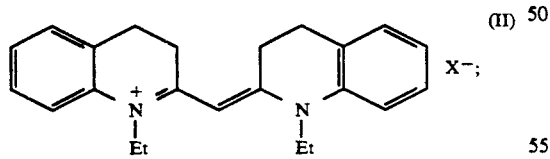

or a carbocyanine dye having the following structure of formula (IV), (V), or (VI) respectively:

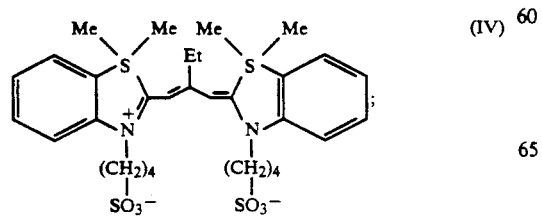

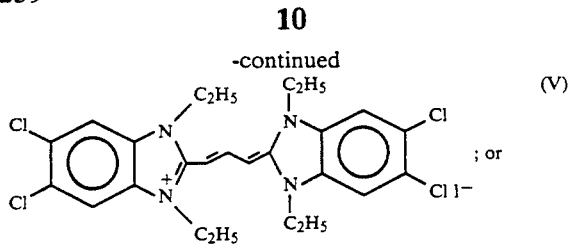

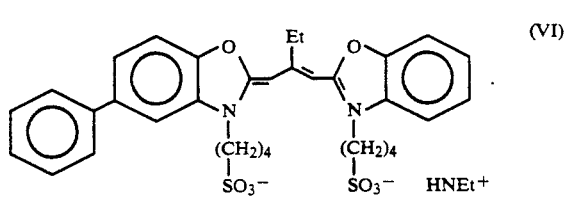

3. The device of claim 1 wherein the optical element comprises said J-aggregate incorporated in the form of a solution, gel, polymer, or glass.

4. The device of claim 3 wherein the J-aggregate is less that about 0.1 microns in its longest dimension.

5. A nonlinear optical element comprising a dye of the classes cyanine, carbocyanine, phthalocyanine, or squaraine capable of forming J-aggregates present in an aggregated form.

6. The element of claim 5 wherein the dye is a salt of: 1,1'-di-(4-sulfobutyl)-2,2'-cyanine; 5,5'-dichloro-3,3'-di-(4-sulfobutyl)-9-ethylthiacarbocyanine; 5,5'-dichloro-3,3'-di-(2-carboxyethyl)-9-ethylthiacarbocyanine; 5,6,5',6'-tetrachloro-3,3'-di-(4-sulfobutyl)-8,8'-diethyl-azacarbocyanine; 1,1'-diethyl-6,6'-dimethyl-2,2'-cyanine; 3,3'-dimethyl-9-ethylthiacarbocyanine; 3,3'-diethyl-9-methyl-4,5,4',5'-dibenzthiacarbocyanine; 3,3'-dimethyl-9-ethyl-4,5,4',5'-dibenzthiacarbocyanine; 5,5'-dichloro-3,3'9-triethylthiacarbocyanine; 3,3'-dimethyl-5,5'-dichloro-9-ethylthiacarbocyanine; 1',3-diethylthia-2'-cyanine; 1,1'-diethylselena-2'-cyanine; 1-methyl-1'-octadecyl-2,2'-cyanine; 1,1',3,3'-tetraethyl-5,5',6,6'-tetrachloro-benzimidazolocarbocyanine; 1,1'-diethyl-2,2'-pyridocyanine; 4-[(1,3,3'-trimethyl-2-indolenylidene)-ethylidene]-3-methyl-1-phenyl-5-pyrazalone; 1,1'-diethyl-2,2'-cyanine halide having the following structure of formula (II) wherein X is halide and is chloride, bromide or iodide:

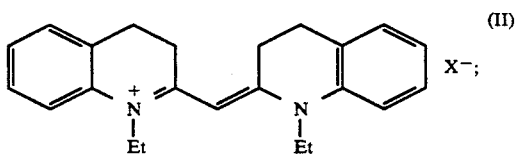

or a carbocyanine dye having the following structure of formula (IV), (V), or (VI) respectively:

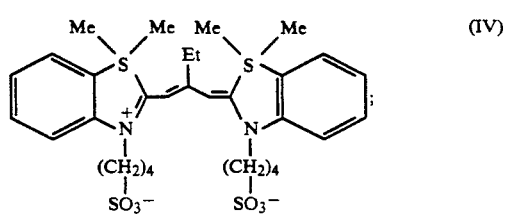

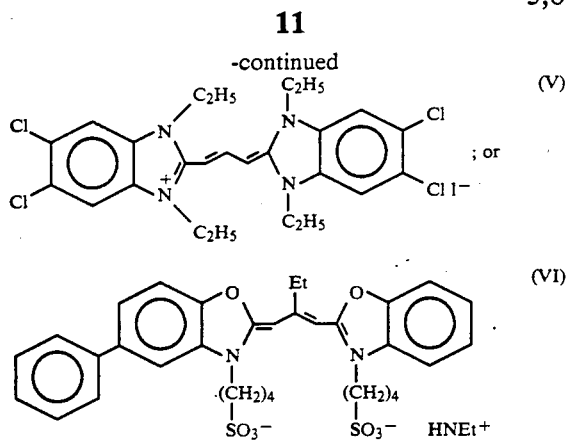

7. The element of claim 5 wherein said J-aggregate is in the form of a solution, gel, polymer or glass.

8. The element of claim 5 wherein the J-aggregate is less than about 0.1 microns in its longest dimension.

9. A method for generating third order nonlinear optical effects comprising illuminating a nonlinear optical element with coherent optical radiation, said nonlinear optical element comprising an aromatic dye capable of forming J-aggregates in an aggregated ordered form.

10. The method of claim 9 wherein the dye is of the class of pyrilium, cyanine, carbocyanine, phthalocyanine, or squaraine.

11. The method of claim 10 wherein the dye is a pyrillium dye salt having the following formula I:

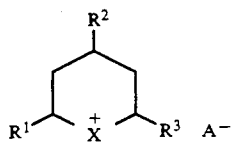

wherein

R$^1$ and R$^3$ are each individually a phenyl radical, or a substituted phenyl radical having at least one C1 to C6 alkyl radical;

R$^2$ is 4-dimethylaminophenyl;

X is NH, O, S, Se, or Te; and

A is an anion comprising perchlorate, fluoroborate, tetrafluoroborate, hexafluorophosphate, iodide, chloride, bromide, sulfate, periodate, or p-toluenesulfonate.

12. The method of claim 8 wherein the dye is a salt of:

1,1'-di-(4-sulfobutyl)-2,2'-cyanine; 5,5'-dichloro-3,3'-di-(4-sulfobutyl)-9-ethylthiacarbocyanine; 5,5'-dichloro-3,3'-di-(2-carboxyethyl)-9-ethylthiacarbocyanine; 5,6,5',6'-tetrachloro-3,3'-di-(4-sulfobutyl)-8,8'-diethyl-azacarbocyanine; 1,1'-diethyl-6,6'-dimethyl-2,2'-cyanine; 3,3'60-dimethyl-9-ethylthiacarbocyanine; 3,3'-diethyl-9-methyl-4,5,4',5-dibenzthiacarbocyanine; 3,3'-dimethyl-9-ethyl-4,5,4',5'-dibenzthiacarbocyanine; 5,5'-dichloro-3,3',9-triethylthiacarbocyanine; 3,3'-dimethyl-5,5'-dichloro-9-ethylthiacarbocyanine;

1',3-diethylthia-2'-cyanine; 1,1'-diethylselena-2'-cyanine; 1-methyl-1'-octadecyl-2,2'-cyanine; 1,1',3,3'-tetraethyl-5,5',6,6'-tetrachloro-benzimidazolocarbocyanine; 1,1'-diethyl-2,2'-pyridocyanine; 4-[(1,3,3'-trimethyl-2-indolenylidene)-ethylidene]-3-methyl-1-phenyl-5-pyrazalone; 1,1'-diethyl-2,2'-cyanine halide having the following structure of formula (II) wherein X is halide and is chloride, bromide or iodide:

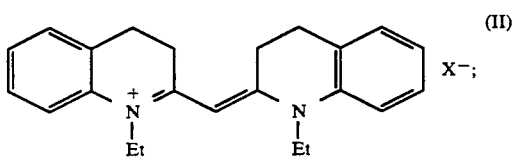

2,6-diphenyl-4-(4'-dimethylamino)phenyl-thiapyrilium tetrafluoroborate having the following structure of formula (III):

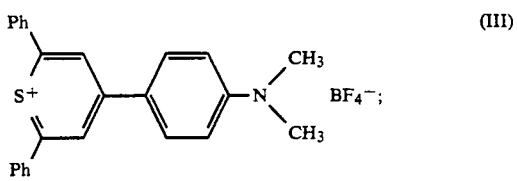

or a carbocyanine dye having the following structure of formula (IV), (V), or (VI) respectively:

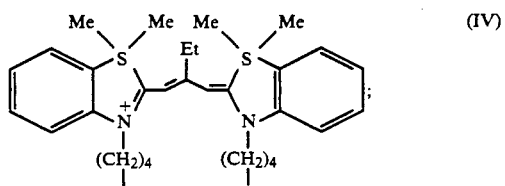

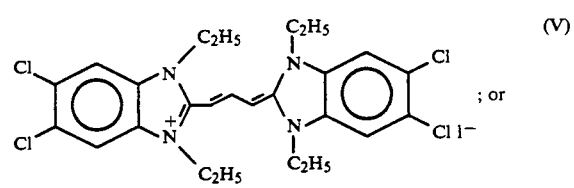

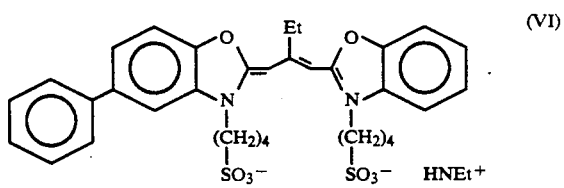

13. The method of claim 10 wherein the J-aggregate is in the form of a solution, gel, polymer, or glass.

14. The method of claim 10 wherein the J-aggregate is less than 500 angstroms in its longest dimension.